May 31, 1932. G. C. SMITH 1,860,754
CORNER AND DIVISION BAR
Filed Aug. 26, 1930     2 Sheets-Sheet 1
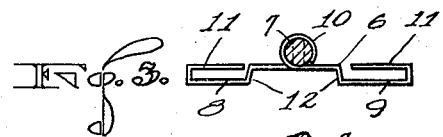
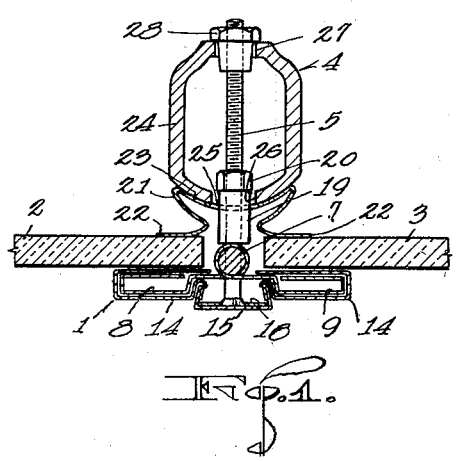
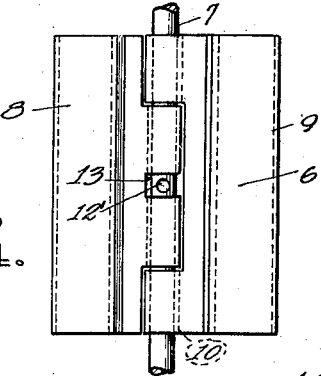
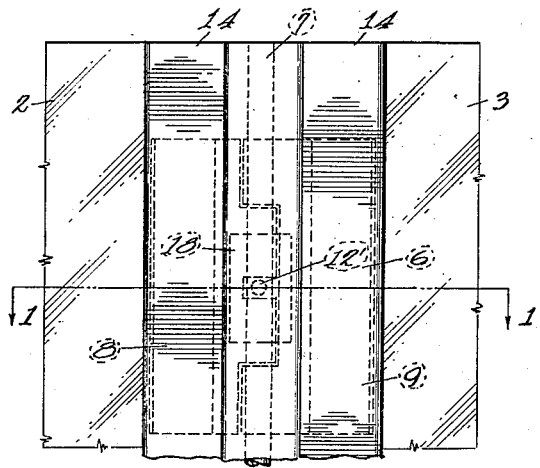
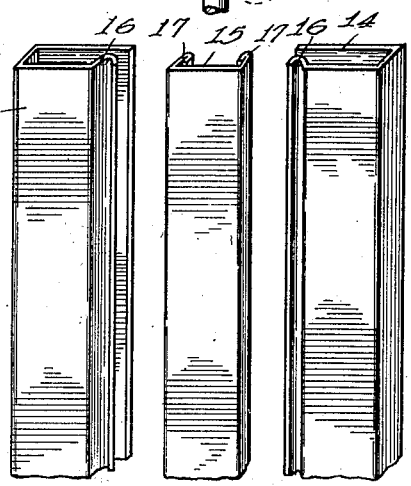
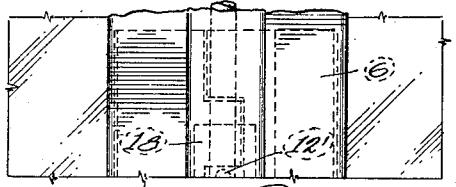
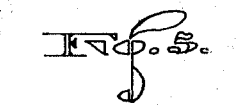
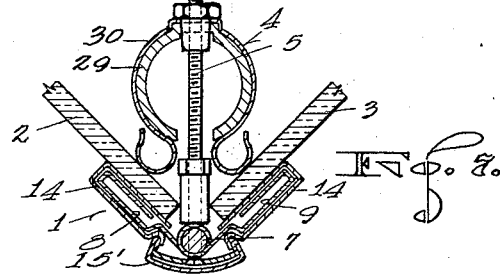
INVENTOR.
GROVER C. SMITH.
BY Munn &Co.
ATTORNEYS.

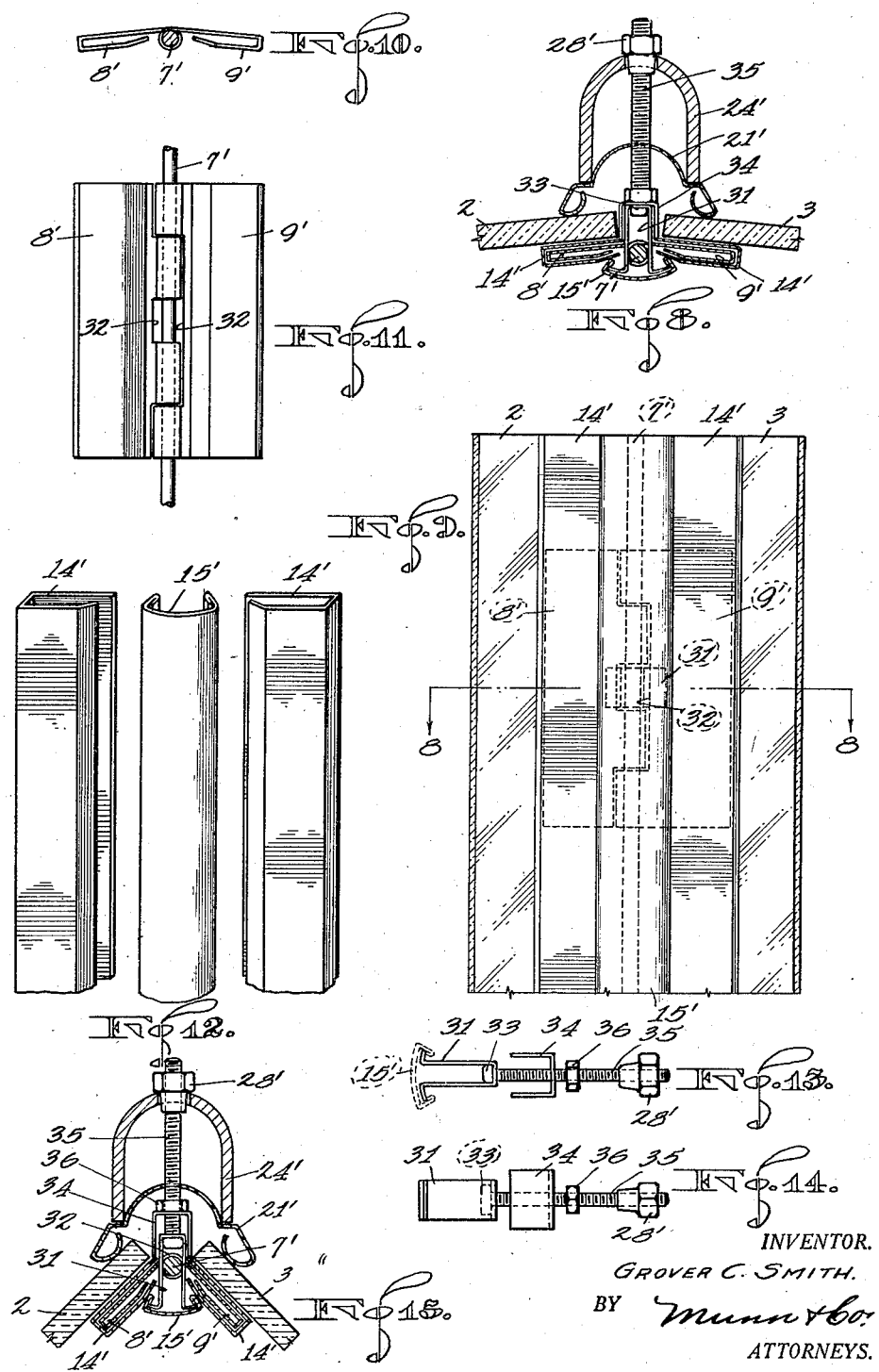

Patented May 31, 1932

1,860,754

UNITED STATES PATENT OFFICE

GROVER C. SMITH, OF OGDEN, UTAH

CORNER AND DIVISION BAR

Application filed August 26, 1930. Serial No. 477,883.

The present invention relates to improvements in corner and division bars used for joining sections of plate glass used in show windows and the like, and the principal object of the invention is to make bars of this character adjustable so that the same bar may be used for a division bar as well as for a corner bar. The term division bar is generally used where two plate glass sections are to be joined in the same plane, that is at an angle of 180 degrees, while the term corner bar is generally used when the sections of plate glass are joined at angles varying from 90 to 180 degrees. At times it is also necessary to join plate glass sections at angles of more than 180 degrees, in which case the angle instead of projecting outside, that is toward the street, projects inwardly, that is into the store space, and in this case a bar of slightly different character is used, which is normally referred to as a reverse bar. My invention, with slight modifications, applies also to reverse bars and when used as such is also adjustable to various degrees of angularity.

A further object of the invention is to provide a bar of the character described that is particularly strong and compact, and that may be adjusted in such a manner that the pressure is not applied to the extreme edges of the plate glass but to a line somewhat spaced from the edges whereby chipping and breaking of the glass is effectively prevented, as the wings of the bar automatically adjust themselves to fit the glass when the bar is being tightened on the final assembly.

In a bar of the character described, the adjacent sections of the plate sections are jointed by means of hinges, and it is one of the objects of the present invention to build all the hinges employed around a single rod extending throughout the height of the window whereby proper alignment of the hinges is secured at all times, and whereby all the hinges are combined into a single strong unit.

It is further proposed in the present invention to provide suitable means for the spacing of the hinges and to use this means at the same time for adjusting the angularity of the hinges, and for bracing the hinges against a bracing bar provided rearwardly of the joint.

It is further proposed to provide certain details of construction that will tend to make the device particularly effective and marketable.

Further advantages of my invention will appear as the specification proceeds.

The preferred forms of my invention are illustrated in the accompanying drawings, in which Figure 1 shows a horizontal section through my device, when used as a partition bar between two sections of plate glass, arranged in a single plane or at an angle of 180 degrees, the section being taken along line 1—1 of Figure 2;

Figure 2 a front view of a joint between two sections of plate glass, made in accordance with my invention;

Figure 3 a detail view in plan of a hinge employed in my device;

Figure 4 a front view of the hinge;

Figure 5 perspective views of three different cover strips used in my invention;

Figure 6 a perspective view of an anchor plate forming part of my invention;

Figure 7 a horizontal section through an arrangement similar to that of Figure 1 in which the plates are arranged at an angle of substantially 90 degrees;

Figure 8 a horizontal section illustrating a modified form of my adjustable bar used as a reverse bar;

Figure 9 a front view of the arrangement shown in Figure 8;

Figure 10 a detail view in top plan of a hinge used in the device shown in Figure 8;

Figure 11 a front view of the hinge shown in Figure 10;

Figure 12 perspective views of three different cover strips used in the form of Figure 8;

Figure 13 a top plan view of a fastening means used in the form of Figure 8;

Figure 14 a side view of the same fastening means; and

Figure 15 a horizontal section showing the reverse bar of Figure 8 as used when the plate glass sections are arranged at an angle of substantially 90 degrees.

While I have shown only the preferred forms of the invention, I wish to have it understood that various changes or modifications may be made within the scope of the claims hereto attached without departing from the spirit of the invention.

Referring first to the form shown in Figures 1 to 7, in which my device is used as either a division or a corner bar, it will be seen that my invention comprises in its principal features an outer assembly 1, bearing against the outer faces of the adjacent edges of two plate glass sections indicated at 2 and 3, an inner assembly 4 bearing against the inner edges of the plate glass sections, and a means for clamping the two assemblies upon the glass, including a bolt 5.

The outer assembly comprises a hinge 6 illustrated in Figure 3, consisting of a hinge pin 7, and two hinge straps 8 and 9 pivoted to the pin 7 as shown at 10. The straps are preferably made of sheet metal, and the outer sections thereof are bent in cross section to present a rectangular form as shown at 11, the rectangular portions providing shoulders at 12. The hinge pin, as will be seen from Figure 3 is offset relative to the plane of the hinge straps so that when the straps bear on the faces of two adjacent glass plates, the hinge pin 7 stands substantially in the plane of the plates.

The hinge pin is made sufficiently long to extend throughout the height of the window while the hinges are arranged thereon in spaced relation, preferably about ten inches apart. Separate pins for each hinge may be used, if it is so desired. The hinge pin is formed with a perforation 12' for each pair of hinged straps, and the adjacent bearing portion of the strap is suitably recessed as at 13 to allow of access to the perforation for purposes hereinafter mentioned.

The outer assembly further comprises the three cover strips shown in Figure 5 including two wing strips 14 and a center strip 15. The wing strips are substantially channel shaped and are adapted to be telescoped over the rectangular sections of the straps 8 and 9 respectively. They are made to correspond to the full height of the window and when they are telescoped over the hinge straps they hold the corresponding straps of the various hinges in alignment while not interfering with the hinged motion around the pin 7. The inner edges of the wing strips 14 are curved to present inverted grooves 16 confronting one another, and adapted to be used as anchoring means for the center strip 15 which also extends throughout the height of the window. This center strip is made channel shaped and the two legs 17 thereof are turned upon themselves at their ends so as to present rounded bearing edges adapted to be received in the grooves 16 with freedom of turning movement of the wing strips relative to the center strip.

The center strip has anchored therein by means of small plates 18, one of which is shown in Figure 6, a number of bolts 5, these bolts corresponding in number to the number of hinges employed, and being adapted to pass through the perforations 12' so as to hold the hinge straps against endwise movement on the hinge pin 10. A spacing sleeve 19 is provided on the bolt 5 to bear against the hinge pin, and a nut 20 bears on the spacing member for drawing the center strip 15 toward the hinge pin, and for determining the angularity of the hinge. It will be noted, for instance, that when the nut 20 is screwed downward on the bolt 5, the center strip 15 will be drawn toward the hinge pin 7, which will cause the two sides of the center piece to bear, through the grooves 16, on the hinge straps 6 adjacent the shoulders 12, whereby the hinged straps are made to turn on the pin 7 so that the entire arrangement gradually changes from the position shown in Figure 1 to the angularity shown in Figure 7, the degree of adjustability depending largely upon the particular shapes selected.

The inner assembly shown in the drawings in various forms is largely conventional in character, and comprises, as shown in Figure 1, a backing strip 21 having two end sections 22 adapted to bear on the inner edges of the two glass plates, and being concave as shown at 23, to form a seat for the bracing post 24. Both the backing strip and the bracing post are suitably perforated as shown at 25, 26 and 27 to allow the bolts 5 to extend therethrough, while nuts 28 are threaded onto the bolt for clamping the inner and outer assemblies upon the edges of the plate glass.

The form shown in Figure 7 is only slightly different from that of Figure 1, the principal differences being a slightly different form of center strip, the web 15' of which is curved instead of being straight, and in the form of the inner assembly in which the bracing post 29 is encircled by the backing strip 30, and thus reinforces the latter.

The reverse bar illustrated in Figures 10 to 15 follows substantially the same principles as the bar previously described, and comprises in its principal features the hinge pin 7', the hinge straps 8' and 9', the wing strips 14', the backing strip 21' and the bracing post 24'. As will be noted from Figure 10, particularly, the hinge pin 7' is arranged on the inner face of the hinge instead of on the outer face, and it will be noted that while in Figure 1, the hinge pin lies substantially in the plane of the two glass sections to be joined, the hinge pin of Figure 8 lies outside of the plane.

The principal difference between the two forms lies in the adjusting means. In the form shown in Figures 8 and 15, particularly, I use for this purpose a U shaped member 31, the legs of which are turned outwardly at their ends and are anchored in the center strip 15' which corresponds substantially to the center strip 15 but has a slightly different shape. The U shaped member 31 straddles the hinge pin 7', the hinge straps being suitably recessed as shown at 32, for this purpose, and has the bolt head 33 anchored in the base portion. A second U shaped member 34 is sufficiently large for telescoping on the first U shaped member, and is slidable on the bolt 35. The legs of the second U shaped member are adapted to bear against the inner edges of the wing strips 14' and through the latter on the hinge straps very near the hinge pin, so that when the second U shaped member is forced upon the first U shaped member by means of a nut 36, the hinge pin 7' is forced toward the center piece 15' and the relative positions are gradually changed from that shown in Figure 15 to that of Figure 8. The outer and inner assemblies are clamped upon the glass sections by means of the nut 28'.

It should be noted that throughout the drawings the hinge straps and the wing strips surrounding the same are shown as being slightly spaced. This is done principally of the sake of clearness and to indicate that there is an easy sliding fit between these parts.

The manner of assembling my bars will be readily understood from the foregoing description. Referring to the form of Figure 1, for instance, the hinge pin 7 which is preferably made of the standard length of 21 feet is formed with the perforations 12' at suitable distances, say ten inches apart, and a corresponding number of hinge straps are telescoped on the pin and properly positioned relative to the straps. Next the center piece 15 is formed and the bolts 5 are anchored therein in the manner previously described, the number and position of the bolts corresponding to that of the perforations in the pin 7. The bolts are then introduced into the perforations whereby the hinges are definitely positioned. Next the wing strips 14 which are of the same length as the hinge pin 7 are telescoped over the hinge straps whereby all the latter are brought into alignment and the center strip is brought into contact with the wing strips in the manner shown in Figure 1. Now the spacing member 19 and the nut 20 are applied whereupon the backing strip and bracing post may be fastened to the assembly by means of the nut 28. The entire assembly which is preferably of the conventional length of 21 feet may be shipped in this form, and is cut into suitable lengths at the place of installation, the lengths corresponding to the height of the window plates. For installation, the glass plate sections 2 and 3 are suitably positioned as shown in Figure 1, the outer and inner assemblies are taken apart and the outer assembly is made to lie against the outer faces of the two sections. In this connection, it should be observed that the outer assembly should preferably be adjusted to an angle slightly smaller than that of the two plate sections, so that when in the final tightening the two assemblies are drawn together, the wing strips of the outer assembly will first make contact with the plate glass along the outer edges of the wings, and spaced a considerable distance away from the inner edges of the glass sections whereby chipping and breaking along the edges is largely avoided. Next the backing strip and bracing post are applied, and the tightening of the nut 28 finishes the operation.

I claim:

1. An adjustable corner and division bar for plate glass sections comprising a hinge pin, a plurality of pairs of hinge straps pivoted thereto in spaced relation, a pair of channel shaped wings coextensive with the height of the glass sections adapted to be telescoped over the hinge straps so as to aline the same and terminating in confronting grooves, a channel shaped center piece anchored in the grooves and allowing the wings to swing into various angular positions relative to each other, and means for spacing the hinge pin and the center piece whereby the angularity of the hinge straps may be adjusted.

2. An adjustable corner and division bar for plate glass sections comprising a hinge pin, a plurality of pairs of hinge straps pivoted thereto in spaced relation, a pair of channel shaped wings coextensive with the height of the glass sections adapted to be telescoped over the hinge straps so as to aline the same and terminating in confronting grooves, a channel shaped center piece anchored in the grooves and allowing the wings to swing into various angular positions relative to each other, a bolt for each pair of hinge straps anchored in the center piece and extending through the hinge pin and means on the bolt for spacing the hinge pin relative to the center piece whereby the angularity of the device may be adjusted.

3. An adjustable corner and division bar for plate glass sections comprising a hinge pin, a plurality of pairs of hinge straps pivoted thereto in spaced relation, a pair of channel shaped wings coextensive with the height of the glass sections adapted to be telescoped over the hinge straps so as to aline the same and terminating in confronting grooves, a channel shaped center piece anchored in the grooves, a U shaped member for each pair of hinges straddling the pin and anchored in the center piece and means coacting therewith for adjusting the angularity of the hinge straps.

4. An adjustable corner and division bar for plate glass sections comprising a hinge pin, a pair of hinge straps pivoted thereto, a pair of channel shaped wings coextensive with the height of the glass sections adapted to be telescoped on the straps in an endwise direction and terminating at their inner ends in confronting grooves, a center strip anchored in the grooves and allowing the wings to swing into various angular positions relative to each other and means anchored in the center strip and engaging the pin for adjusting the spacing between the strip and the pin and thereby the angularity of the hinge straps.

5. An adjustable corner and division bar for plate glass sections comprising a pair of hinge straps, a pivotal connection between the same, a pair of channel shaped wings coextensive with the height of the glass sections adapted to be telescoped on the straps and terminating at their ends in confronting grooves, a center strip anchored in the grooves and allowing the wings to swing into various angular positions relative to each other and means for drawing the hinge connection toward the center strip whereby the angularity of the hinge strap may be adjusted.

6. An adjustable corner and division bar for plate glass sections comprising a hinge pin, a pair of hinge straps pivoted thereto, a pair of wings coextensive with the length of the glass sections adapted to be telescoped on the straps in an endwise direction, a center strip connecting the wings and allowing the latter to swing into various angular positions relative to each other, a U-shaped member straddling the pin and having its legs anchored in the center strip, a second U-shaped member abuttable against the ends of the wings for holding the latter relative to the center strip, and means coacting with the U-members for positioning the hinge pin relative to the center strip.

Signed at Ogden city, in the county of Weber and State of Utah, this 11th day of August, 1930.

GROVER C. SMITH.